Patented Mar. 4, 1941

2,233,407

UNITED STATES PATENT OFFICE 2,233,407

FUNGICIDE

Lawrence H. Flett, Hamburg, N. Y., assignor to National Aniline & Chemical Company, Inc., New York, N. Y., a corporation of New York.

No Drawing. Application July 31, 1936, Serial No. 93,718

6 Claims. (Cl. 167—31)

This invention relates to fungicidal compositions of matter and their use as fungicides. The compositions of this invention are especially suitable for application to plants, trees, shrubs, and the like to free and protect the same from plant diseases and fungi.

In my applications Serial Nos. 691,081 and 691,082, filed September 26, 1933, I have disclosed sulfonated aromatic compounds of the type AHRS (wherein A represents an aromatic nucleus; i. e., an aromatic nucleus which may contain only the groups represented by H, R, and S as substituents or which may contain additional substituents, H represents a nuclear hydroxyl group, R represents a nuclear alkyl group containing at least 12 carbon atoms, and S represents a nuclear sulfonic acid group in the free acid or salt form), and especially alkyl phenol sulfonic acid compounds which correspond with the general formula

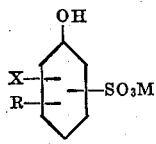

in which X represents hydrogen or a methyl group, R represents a nuclear alkyl hydrocarbon radical (saturated or unsaturated) containing 12 or more carbon atoms, and M represents hydrogen or a metal, particularly an alkali metal, or an ammonium or organic ammonium radical.

Further, in my application Serial No. 737,777, filed July 31, 1934, which has issued as United States Patent No. 2,196,985, I have disclosed products of the type AHRS in which the alkyl group represented by R is derived from a petroleum distillate boiling between 80° C. at atmospheric pressure and 380° C. at 50 mm. pressure, and especially mixed products of the said type.

According to the present invention, alkyl aromatic sulfonates of the type ARS (in which A, R and S have the meaning defined above), particularly the said sulfonated alkyl hydroxy aromatic compounds of the type AHRS, and especially those derived from phenol or a cresol, preferably by condensation with a halogenated hydrocarbon mixture of the type of Pennsylvania petroleum distillates, are employed per se as fungicides. The fungicidal compositions of this invention comprise any one or a mixture of nuclearly alkylated aromatic sulfonic acids or their salts in which the aryl nucleus has at least one nuclear substituent alkyl group which contains at least 7 carbon atoms. The aryl nucleus may be mono- or polycyclic and can contain other substituents in addition to the essential C-alkyl group and C-sulfo group.

I have found that the said sulfonated products, particularly those derived from halogenated hydrocarbon mixtures of the type of Pennsylvania petroleum distillates disclosed in my Patent No. 2,196,985, are valuable parasiticides which are characterized by effective parasiticidal action in addition to wetting and spreading power. The term "parasiticides" as employed herein denotes collectively fungicides, insecticides, insectifuges, and vermicides. As a result they can be employed in concentrations in aqueous or other solutions and dispersions or powders in low concentrations. Thus, they are effective in aqueous solutions of a concentration on the order of 0.01% to 5% of said sulfonate. They are ordinarily applied in concentrations of 0.1% to 1.0% and, in general, 0.5% of said sulfonate. They are highly effective both against insects controlled by contact poisons and by stomach poisons, since they act both as contact and as stomach poisons, and further are effective for the control of most fungi including those controlled by copper compounds and those controlled by sulfur. Many of the organic ammonium salts are of relatively low solubility in water and are of an adherent nature which renders them of value in the control of parasites on vegetation.

The compositions of the present invention have the further advantage that the said alkyl aromatic sulfonates when combined with non-poisonous metals or bases such as the alkali metals, are sufficiently non-toxic to warm-blooded animals to permit their use as parasiticides in proximity to cattle in cases where known poisonous fungicides are harmful.

The number of carbon atoms in the alkyl group represented by R may vary from 7 to 35. Compounds in which the alkyl group contains 10 to 19 carbon atoms, and especially 12 to 18 carbon atoms, are particularly effective in view of their superior combination of wetting, spreading and parasiticidal properties and are preferred. Further, the alkyl group represented by R is preferably an open-chain hydrocarbon radical.

Preferred compounds employed in accordance with the present invention are the mixed alkyl derivatives of aromatic sulfonic acids of the benzene series (i. e., aromatic sulfonic acids containing a single benzene nucleus), especially mixed alkyl derivatives of phenol and cresol sulfonic acids, in which the alkyl groups correspond with the aliphatic hydrocarbons of petroleum distillates and similar products boiling mainly above 170° C. at atmospheric pressure, more particularly between 170° C. at atmospheric pressure and 215° C. at 50 mm. pressure and especially between 215° C. and 300° C. (both at atmospheric pressure), and especially aliphatic hydrocarbon mixtures of the Pennsylvania petroleum kerosene type, of said boiling characteristics, which are obtainable by halogenation of the said petroleum distillate or similar products, followed by condensation of resulting mixed alkyl halides with the corresponding aromatic compound, preferably with the aid of a metal halide condensing agent, and sulfonation of resulting mixed alkyl derivatives of the aromatic compound, as disclosed in my Patent No. 2,196,985.

In those cases where it is desired to employ an insoluble form of the sulfonate in an aqueous medium, a water-soluble form of the same or of another sulfonate of the said type can be employed to disperse the insoluble sulfonate, whereby the advantageous properties of both forms come into play. The soluble alkyl aryl sulfonates can be mixed mechanically with the insoluble amine salts of the alkyl aryl sulfonates, or the amine salts and soluble sulfonates can be incorporated in a water suspension or solution, or in a solution in an organic solvent. The liquid phase of the dispersion or solution can then be removed by mechanical means or evaporation, to leave a solid or thick paste, which can be incorporated at will and at a desired concentration in water or an organic solvent.

The said alkyl aromatic sulfonates may be obtained by various methods, a number of which are disclosed in said applications Serial Nos. 691,081 and 691,082, Patent No. 2,196,985.

The alkyl aromatic sulfonates may be employed in accordance with the present invention in the form of their free sulfonic acids or in the form of salts of metals (as for example, of the alkali metals) or of organic bases, or of ammonia, etc. The salts may be obtained in any suitable manner; for example by reacting the alkyl aromatic sulfonic acid, either in the crude form resulting from the sulfonation of the corresponding alkyl aromatic compound or in a purified form, with a metal oxide or hydroxide or an organic base, or of a suitable salt of one of these, preferably in an amount adapted to form a neutral product.

The organic amines which may be used for neutralizing the alkyl aryl sulfonic acids to form the amine salts of the compositions of this invention can be aliphatic, aromatic or heterocyclic. They are preferably free from salt-forming groups, such as sulfonic or carboxylic groups. The preferred amines form salts with the sulfonated alkyl aryl compounds which are insoluble or slightly soluble in water, and, therefore, resist removal by water, for example, rain. Their dispersions retain the toxic characteristics of the amines and the spreading, wetting and penetrating qualities of the alkyl aryl sulfonates.

Among the bases, oxides and salts which may be employed to produce salts useful in accordance with the present invention, are, for example, sodium, potassium and ammonium hydroxides; sodium, potassium carbonates and bicarbonates; ammonia; magnesium oxide; basic copper carbonate; ethylamine; mono-, di- and tri-propylamines, -butylamines, -amylamines, etc.; pyridine; triethanolamine; propanolamines; butanolamines; diamino propanol, triethylene tetramine, quinaldine, aniline, toluidines, phenetidines, stearylamine, ethylene diamine, quinoidine, piperidine, cetylamine, nicotine, etc. Mixed amines also may be employed.

The invention will be illustrated by the following examples in connection with mixed alkyl phenol sulfonates obtained from a Pennsylvania kerosene distillate as disclosed in Example 24 of Patent No. 2,196,985. According to this example a mixture of alkyl derivatives of phenol, in which the alkyl groups are derived from the kerosene distillate, is sulfonated and the sulfonation mixture is neutralized. For convenience the unneutralized sulfonation product will be referred to herein as "kerosene phenol sulfonic acid". It will be understood that the invention is not limited thereto and that others of the alkyl aromatic sulfonates of the present invention can be similarly employed. The parts are by weight.

EXAMPLE 1

The sodium salt of kerosene phenol sulfonic acid, free from inorganic sulfates, is dissolved in water. The effectiveness of the resulting solution as an insecticide is shown in the following tables.

I. *Insecticide by spraying as contact poison*

| Parasite | Percent concentration | Percent kill | Time in hours |
|---|---|---|---|
| Aphis pomi | 0.5 | 99.2 | 48 |
| Do | 0.125 | 98.5 | 24 |
| Aphis spirecola | .25 | 96.3 | 24 |
| Anasa tristis | 0.5 | 80 | 48 |
| Leptinotarsa decimlineata (Colorado potato beetle) | 0.5 | 70 | 48 |
| Aster lace fly | 0.5 | 97 | 48 |

II. *Insecticide by spraying leaves (Stomach poison)*

| Parasite | Percent concentration | Percent kill | Time in hours |
|---|---|---|---|
| Leptinotarsa decimlineata | 0.25 | 56 | 24 |
| Do | 0.25 | 63 | 48 |
| Do | 0.25 | 100 | 100 |
| Do | Control | 0 | 48 |
| Do | Control | 10 | 100 |
| Anasa tristis | 0.25 | 75 | 100 |
| Do | Control | 5 | 100 |

The following table illustrates the effect of varying acidity upon the insecticidal action of the product as a contact insecticide.

III.

| Parasite | Percent concentration | pH | Percent kill in 48 hours |
|---|---|---|---|
| Aphis pomi | 0.05 | 2.9 | 100 |
| Do | 0.05 | 4.9 | 100 |
| Do | 0.05 | 7.0 | 94.6 |
| Do | 0.05 | 9.1 | 70 |
| Do | 0.05 | 11.0 | 70 |

EXAMPLE 2

An aqueous solution of kerosene phenol sulfonic acid (substantially free from residual sulfuric acid) is neutralized with mono-amyl amine to render it neutral to Congo 4B and Brilliant Yellow C papers. A mixture of amine salts of the kerosene phenol sulfonic acid separates as an oil and is removed from the aqueous layer. It is a dark brown viscous liquid which is lighter than water in which it is only very slightly soluble. It is readily dispersed in aqueous solutions by water-soluble dispersing agents, as for example, the sodium alkyl aromatic sulfonates herein disclosed. For such dispersions, an amount of dispersing agent ranging from about one quarter to an equal weight of the amine salt is sufficient. The amine salt is also soluble in organic solvents as, for example, benzene.

Aqueous compositions, which contain up to about 1 per cent by weight of these amine salts may be used as parasiticidal sprays for plants, without fear of phytocidal effects. The aqueous sprays wet and spread over the leaves and stems of the plants very rapidly and adhere in the form of thin continuous films.

EXAMPLE 3

Triamylamine is employed instead of monoamylamine in above Example 2. The neutralized mixture, after standing for some time, separates into two layers. The upper, oily layer of triamylamine salts of the mixed alkyl phenol sulfonates is removed and is used in water dispersions in concentrations of 0.25 to 5 parts of the amine sulfonates per 100 parts water containing a dispersing agent. These aqueous dispersions form excellent insecticides and parasiticides for treating plants, and as a parasiticide and insectifuge in animal shelters and runs (for example, chicken coops).

EXAMPLE 4

An aqueous solution of the kerosene phenol sulfonic acid employed in above Example 2 is neutralized with a solution of quinoidine in alcohol. ("Quinoidine" is the name applied to the mixture of alkaloid substances remaining after extraction of the more valuable and crystalline alkaloids from crude cinchona.) The mixture, after evaporating the alcohol, leaves a thick paste which is insoluble in water. 10 parts of this thick paste, 10 parts of a salt-free mixture of sodium kerosene phenol sulfonate, and about 20 parts of alcohol are thoroughly mixed, and the resulting paste is dried by evaporation of the alcohol. The dry residue can be dispersed in water easily to give milky emulsions which may be used as insecticidal sprays. Such emulsions containing up to 2 per cent of the dry mixture, are made quite readily.

EXAMPLE 5

An aqueous solution of kerosene phenol sulfonic acid employed in above Example 2 is neutralized with commercial 95 per cent nicotine base, with the addition of sufficient alcohol to permit the neutralized mixture to be agitated thoroughly and easily. After neutralization, the alcohol is evaporated until the mixture is noninflammable.

The following table illustrates the insecticidal action of the products of above Examples 2 to 5.

IV. Insecticide by spraying as contact poison

| Product of Example No. | Parasite | Percent concentration | Percent kill | Time in hours |
|---|---|---|---|---|
| 2 | Black ants | 0.5 | 90 | 48 |
| 5 | Aphis pomi | 0.04 | 100 | 24 |
| 5 | do | 0.03 | 98.6 | 24 |
| 5 | do | 0.02 | 82 | 24 |
| 5 | Leptinotarsa decimlineata | 0.5 | 100 | 24 |
| 5 | Aster lace fly | 0.3 | 100 | 48 |

V. Insecticide by spraying as stomach poison

| Product of Example No. | Parasite | Percent concentration | Percent kill | Time in hours |
|---|---|---|---|---|
| 5 | Anasa tristis | 0.25 | 100 | 100 |
| 5 | do | Control | 5 | 100 |

The following table illustrates the fungicidal action of alkyl aromatic sulfonates of the present invention. In making these tests an aqueous solution of the sulfonate was sprayed onto a prepared plate, allowed to evaporate and spores of the fungus under test were placed on the resulting plate and allowed to germinate.

VI. Fungicide control

| Product | Parasite | Percent concentration | Percent germination |
|---|---|---|---|
| Sodium lauryl phenol sulfonate. | Apple scab | 1.0 | 0-1 |
| Do | do | Control | 42.5-67 |
| Do | Glomerella cingulata | 1.0 | 0 |
| Do | do | 0.5 | 6.7 |
| Do | do | Control | 88 |
| Do | Macrosponium solani | 1.0 | 0 |
| Do | do | 0.5 | 0 |
| Do | do | Control | 25 |

It will be realized by those skilled in the art that the invention is not limited by the above examples. The present invention further includes the use as fungicides of mixtures of two or more different alkyl aromatic sulfonates of the type herein disclosed.

This application is a continuation-in-part of my application Serial No. 737,777, filed July 31, 1934, now United States Patent No. 2,196,985.

I claim:

1. A fungicidal composition adapted to control fungi of the types controlled by copper compounds and controlled by sulfur comprising a sulfonation product containing a mixture of sulfonated alkyl phenol compounds which differ from each other in the alkyl group, obtainable by halogenation of a petroleum distillate which boils within the range 170° C. to 300° C. at atmospheric pressure, condensation of the resulting halogenated product with a phenol compound selected from the group consisting of phenol and cresol to form a condensation product comprising a mixture of nuclearly alkylated phenol compounds, and sulfonation of at least a portion of the resulting condensation product, said sulfonation product containing a member selected from the group consisting of the free sulfonic acid group and salts of said group.

2. A fungicidal composition adapted to control fungi of the types controlled by copper and controlled by sulfur comprising a sulfonation product containing a mixture of sulfonated alkyl phenol compounds which differ from each other in the alkyl group, obtainable by the halogenation of a petroleum distillate which boils within the range 215° C. to 300° C. at atmospheric pressure, condensation of the resulting halogenated product with a phenol selected from the group consisting of phenol and cresol to form a condensation product comprising a mixture of nuclearly alkylated phenol compounds, and sulfonation of at least a portion of the resulting condensation product, said sulfonation product being in the form of the sodium sulfonate.

3. A fungicidal composition containing as an essential fungicidal constituent a mixture of alkyl phenol sulfonates of the benzene series which differ from each other in the alkyl groups and wherein the alkyl groups are derived from a petroleum distillate which boils mainly within the range 170° to 300° C. at atmospheric pressure.

4. A process of controlling fungi on living plants which comprises applying to the plant a fungicidal composition containing as an essential fungicidal constituent a mixture of alkyl phenol sulfonates of the benzene series which differ from each other in the alkyl groups and wherein the alkyl groups are derived from a petroleum distillate which boils mainly within the range 170° C. to 300° C. at atmospheric pressure.

5. A process of controlling fungi on living plants which comprises applying to the plant a fungicidal composition comprising a sulfonation product containing a mixture of sulfonated alkyl phenol compounds which differ from each other in the alkyl group, obtainable by halogenation of a petroleum distillate which boils within the range 170° C. to 300° C. at atmospheric pressure, condensation of the resulting halogenated product with a phenol compound selected from the group consisting of phenol and cresol to form a condensation product comprising a mixture of nuclearly alkylated phenol compounds, and sulfonation of at least a portion of the resulting condensation product, said sulfonation product containing a member selected from the class consisting of the free sulfonic acid group and salts of said group.

6. A process of controlling fungi on living plants which comprises applying to the plant a fungicidal composition adapted to control fungi of the types controlled by copper and controlled by sulfur comprising a sulfonation product containing a mixture of sulfonated alkyl phenol compounds which differ from each other in the alkyl group, obtainable by the halogenation of a petroleum distillate which boils within the range 215° C. to 300° C. at atmospheric pressure, condensation of the resulting halogenated product with a phenol selected from the group consisting of phenol and cresol to form a condensation product comprising a mixture of nuclearly alkylated phenol compounds, and sulfonation of at least a portion of the resulting condensation product, said sulfonation product being in the form of the sodium sulfonate.

LAWRENCE H. FLETT.